United States Patent
Klijn et al.

(10) Patent No.: US 8,854,512 B2
(45) Date of Patent: Oct. 7, 2014

(54) PROCESS, APPARATUS AND COMPUTER PROGRAM FOR ENHANCING DETAIL VISIBILITY IN AN INPUT

(75) Inventors: Jan Klijn, Breda (NL); Helios Jellema, Eindhoven (NL); Sacha Cvetkovic, Eindhoven (NL)

(73) Assignee: Robert Bosch GmbH, Stuttgart (DE)

( * ) Notice: Subject to any disclaimer, the term of this patent is extended or adjusted under 35 U.S.C. 154(b) by 1213 days.

(21) Appl. No.: 12/515,428

(22) PCT Filed: Nov. 24, 2006

(86) PCT No.: PCT/EP2006/068863
§ 371 (c)(1),
(2), (4) Date: Dec. 2, 2009

(87) PCT Pub. No.: WO2008/061567
PCT Pub. Date: May 29, 2008

(65) Prior Publication Data
US 2010/0092104 A1 Apr. 15, 2010

(51) Int. Cl.
*H04N 5/202* (2006.01)
*H04N 5/228* (2006.01)
*H04N 5/20* (2006.01)
*H04N 1/407* (2006.01)

(52) U.S. Cl.
CPC ............ *H04N 5/202* (2013.01); *H04N 1/4074* (2013.01)
USPC .......................... 348/254; 348/222.1; 348/255

(58) Field of Classification Search
USPC ........... 348/254, 122, 222.1, 220.1, 234, 235, 348/251, 255, 243, 241, 223.1, 229.1, 348/225.1, 217.1, 2, 54, 262, 221.1, 362
See application file for complete search history.

(56) References Cited

U.S. PATENT DOCUMENTS 6,141,047 A * 10/2000 Kawai et al. .................. 348/254
6,266,103 B1 * 7/2001 Barton et al. ................. 348/675
(Continued)

FOREIGN PATENT DOCUMENTS

DE  32 38 281    4/1984
EP  1 117 252    7/2001

OTHER PUBLICATIONS

"Image Procecssing Toolbox" for Use With Matlab. User'S Guide Version 2. The Math Works Inc. XP-002440780. 1993.

(Continued)

*Primary Examiner* — Ahmed A Berhan
(74) *Attorney, Agent, or Firm* — Michael J. Striker

(57) ABSTRACT

In the technical field of video cameras gamma correction is an often used technique to compensate the non-linear effects of the CRT (cathode ray tube), in order to enhance visibility in images to be displayed. Gamma correction is—by way of example—expressed by the gamma function: A process for enhancing detail visibility in an input image comprising a step of applying a first transfer function (11) to the input image, thereby generating an intermediate image; a step of performing a statistical measurement (12), Mmt (2) on the intermediate image; a step of applying a second transfer function (14) to the intermediate image, thereby generating an output image; a step of performing a statistical measurement (15), Mmt (3) on the output image, a step of determining gain parameters gg, gk for the first and the second transfer function (11, 14) on basis of the statistical measurement results (8, 12, 15), Mmt (1), Mmt (2), Mmt (3) is proposed.

11 Claims, 7 Drawing Sheets

(56) References Cited

U.S. PATENT DOCUMENTS

Figure 1:
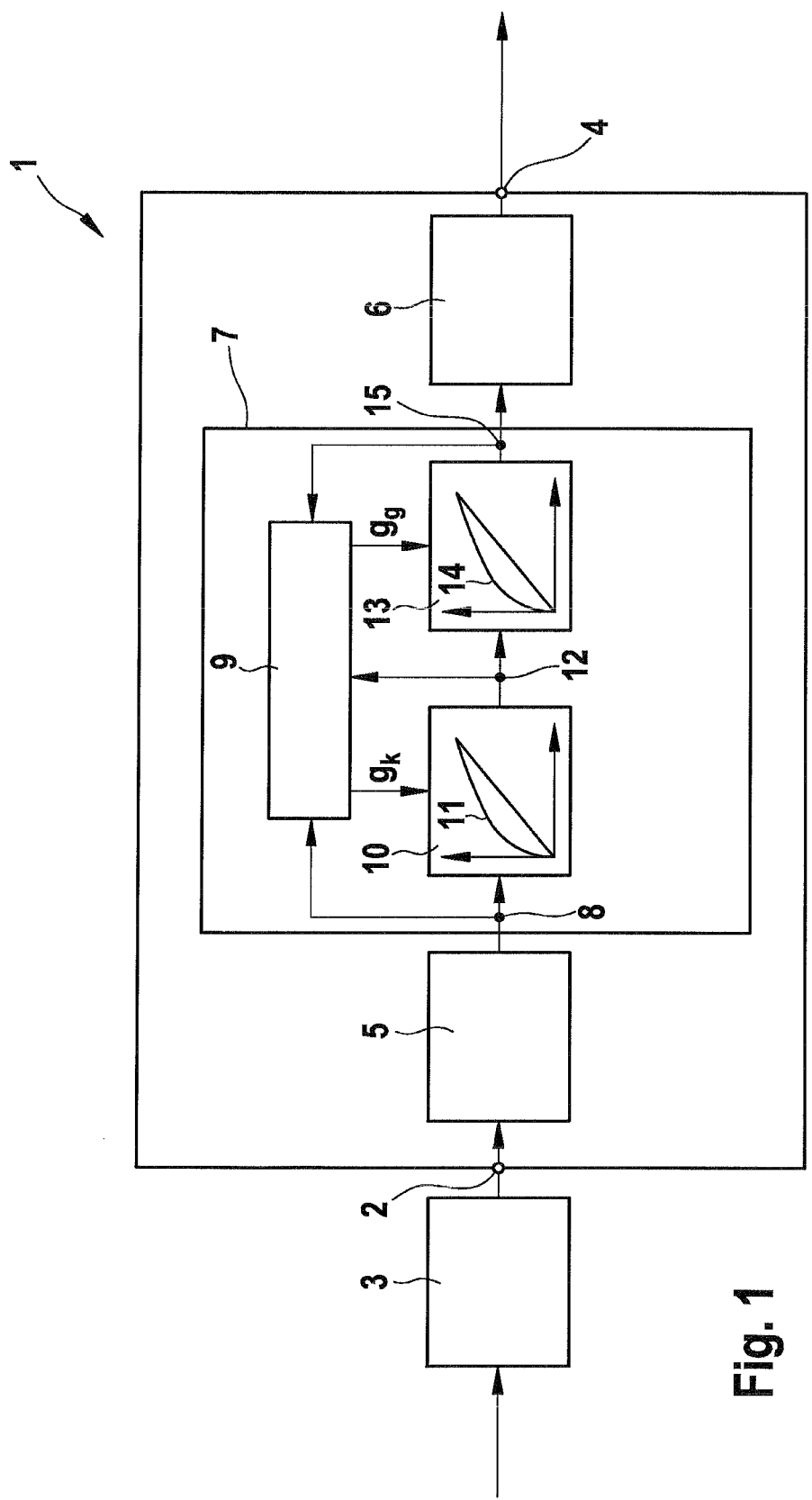

| | | | |
|---|---|---|---|
| 7,088,390 B2* | 8/2006 | Mori et al. | 348/254 |
| 7,477,303 B2* | 1/2009 | Tanji et al. | 348/254 |
| 2004/0061790 A1* | 4/2004 | Tanji et al. | 348/222.1 |
| 2005/0285952 A1 | 12/2005 | Kwon et al. | |

OTHER PUBLICATIONS

S. Cvetkovic et al: "Tone-Mapping Finctions and Multiple-Exposure . . . " IEEE Transactions on Consumer Electronics, vol. 54, No. 2, May 2008.

* cited by examiner

PROCESS, APPARATUS AND COMPUTER PROGRAM FOR ENHANCING DETAIL VISIBILITY IN AN INPUT

STATE OF THE ART

The invention relates to a process, an apparatus and a computer program for enhancing detail visibility in an input image.

In the technical field of video cameras gamma correction is an often used technique to compensate the non-linear effects of the CRT (cathode ray tube) in order to enhance detail visibility in images to be displayed. Gamma correction is—by way of example—expressed by the gamma function:

$$V_{out} = V_{in}^{\gamma},$$

whereby the input and output values are non-negative real values, typically in a predetermined range such as 0 to 1.

The document DE 32 38 281 A1 discloses a digital video-processing system using the above-described or a similar gamma-correction for generating a gamma-corrected video signal, whereby the parameters for the gamma-correction are determined by two resistors.

Using "standard" gamma correction—as described above—often does not satisfy the user completely because it is observed that the dark image details are not sufficiently visible due to the compression of the dynamic range of an image sensor to the display device. As an improvement steeper gamma functions have been constructed. A problem of this approach is that it introduces a high compression to a large portion of the input range and makes the resulting image pale.

DISCLOSURE OF THE INVENTION

According to the invention a process for enhancing detail visibility in an input image with the features of claim 1, an apparatus for enhancing detail visibility in an input image with the features of claim 10 and a respective computer program with the features of claim 11 are proposed. Preferred embodiments of the invention are disclosed by the depending claims, by the description and/or by the figures as attached.

The process for enhancing detail visibility in an input image according to the invention is carried out by digital image processing on the input image. The input image is preferably represented as a grey scale image, so that only one channel is processed. Alternatively, the input image is embodied as a colour image, for example a rgb-image, whereby the process according to the invention is carried out for each channel separately or for a combined intensity channel. However, any image format may be used and in a general sense the process according to the invention may be applied to any sort of normalized linear intensity-like scale of an input image.

The input image is processed by a first transfer function transforming the input image into an intermediate image. The first transfer function maps the input image onto the intermediate image by evaluating each pixel value, especially intensity or luminance value of the pixel, with the first transfer function. The transfer function is preferably realised as a relation of the pixel values of the input image and the pixel values of the intermediate image.

A statistical measurement is performed on the intermediate image, so that a first statistical measurement result is achieved. The first statistical measurement result is preferably realised as a value characteristic for/or describing the intensity or luminance distribution of the pixels of the input image.

After or parallel to the statistical measurement, a second transfer function is applied on the intermediate image, whereby an output image is created. The second transfer function is—analogous to the first transfer function—realised as relation between input values, referring to the intermediate image, and output values, referring to the output image. However, in its broadest sense, the first and the second transfer functions can have any structure. It shall additionally be noted that the expressions input and output image preferably describe the relative position of the images in reference to the process according to the invention and that optional further image processing steps may be performed before, during or after the process according to the invention.

In a further step a statistical measurement is carried out on the output image, thereby generating a second statistical measurement result, which is analogous to the first statistical measurement result preferably embodied as an indicator for the intensity or luminance distribution of the pixels of the output image.

According to the invention, a step of determining gain parameters for the first and the second transfer function on basis of the statistical measurement results is performed. By applying the gain parameters on the transfer functions, the transfer functions are deformed, preferably stretched or flattened and especially non-linearly deformed. Preferably for each transfer function a separate gain parameter is provided, which is especially realised as an one-dimensional, single value.

The underlying idea of the invention is to split an overall transfer function into two transfer functions, which are adapted flexibly to the scene-, light and/or sensor dependent circumstances of the image by gain parameters, which are achieved by evaluating the results of statistical measurements of the intermediate or output image. With this approach of improved tone mapping curves it is possible to get sufficient image detail visibility and contrast-enhanced output images, whereby at the same time the computational costs are kept low.

In a preferred embodiment of the invention each transfer function comprises only a single reversal point, whereby the reversal point of the first transfer function is in view of the input range or level arranged before the reversal point of the second transfer function. Preferably the first transfer function is steeper than the second transfer function in the beginning of the input range, especially luminance or intensity range, and introduces less compression in the last part of the input range. So it is possible to have an overall transfer function, representing the first and the second transfer function, that is steeper in the beginning and less compressing at the end of the input or luminance or intensity range than the common gamma functions.

In a further embodiment of the invention at least one of the transfer functions is realised as a gamma function and/or at least one of the transfer functions is embodied as a knee function, whereby it is further preferred that the first transfer function is the knee function and the second transfer function is the gamma function. The knee and the gamma function may also be expressed as a knee and gamma tone mapping curve, respectively. The gamma function may be represented as the known gamma function as already explained above: $V_{out} = V_{in}^{\gamma}$, whereby the input and output values are non-negative real values, typically in a predetermined range such as 0 to 1. The knee function is a black stretch function made to enhance visibility on darker parts of the scene or image, preferably expressed as a curve having exactly one knee, which is represented as a change of the gradient of the function. The knee function is especially useful for scenes or images with a high dynamic range and signal to noise ratio (SNR) good enough for amplification. The said gamma and knee function may have the advantage that it is possible to change the amount or quota of knee/gamma action in the overall function in order to optimise the output image by using only one control parameter per transfer function.

In yet a further preferred development of the invention the statistical measurement is realised as an intensity or luminance histogram based measurement and/or an intensity or luminance distribution measurement of the intermediate image and of the output image and optional of the input image, whereby preferably the statistical measurement results are suitable to represent data tendency in the image histogram or distribution of the image and thus comprises other or more information than a simple average or mean value. Especially, measurements of the median, the mode and/or the skewness of the histogram and/or of the distribution of the respective image are preferred. The median value is preferably the image (pixel) value at the position dividing the higher half of the histogram or distribution of the image from the lower half. The mode is preferably a value at which the histogram or the distribution attains its maximum value, so informally speaking, the mode is at the peak. The skewness is preferably a measure of the asymmetry of the histogram or distribution.

In preferred realisation the gain parameters are determined in a multivariable control algorithm, which uses the statistical measurement results and the average intensity or average luminance value of the output image as input values.

In an alternative preferred realisation of the invention, the gain parameter for the first transfer function is derived by the statistical measurement result from the intermediate image and the average intensity or luminance level of the intermediate image and/or the gain parameter for the second transfer function is derived by the statistical measurement result from the output image and the average intensity or luminance level of the output image. Thus the step of determining the gain parameters for two transfer functions is performed independently, so that for example two separated flexible circuits or program parts are used for determining the gain parameters.

In a preferred development of the invention, the gain parameters are calculated or estimated on the basis of the statistical measurement and an average (mean) intensity or luminance measurement of the respective image, whereby especially a comparison between the statistical measurement result(s) and the average value is employed.

Preferably the gain parameters are modified stepwise especially by incrementing and/or decrementing the gain parameters by a predetermined maximum value for example so that the maximum change of gain per field is kept under 0.1 dB. In a preferred realisation the process according to the invention is performed iteratively for each input image and/or the process according to the invention is applied on a series or sequence of input images, whereby the gain parameters are iteratively modified image-wise or image by image.

The invention further relates to an apparatus for enhancing visibility in an input image, preferably according to the process according to the invention as elucidated above, which comprises a first image processing unit which is realised to apply a first transfer function on the input image and to generate an intermediate image, a first statistical measurement unit which is realised to perform a statistical measurement on the intermediate image, a second processing unit realised to apply a second transfer function on the intermediate image and to generate an output image, a second statistical measurement unit realised to perform a statistical measurement on the output image and a determining unit realised to determine gain parameters for the first and the second transfer function on basis of the statistical measurement results.

The apparatus is preferably realised as a computer system, an embedded system, a micro-controller, DSP or the like and is further preferably adapted to perform all or a combination of any steps of the process according to the invention. In a preferred realisation the apparatus is part of a video monitoring system adapted to monitor various places.

The invention further relates to a computer program comprising program code means for performing all the steps of the process according to invention, when said program is run on the computer and/or on the apparatus according to the invention.

SHORT DESCRIPTION OF THE DRAWINGS

Figure 2:
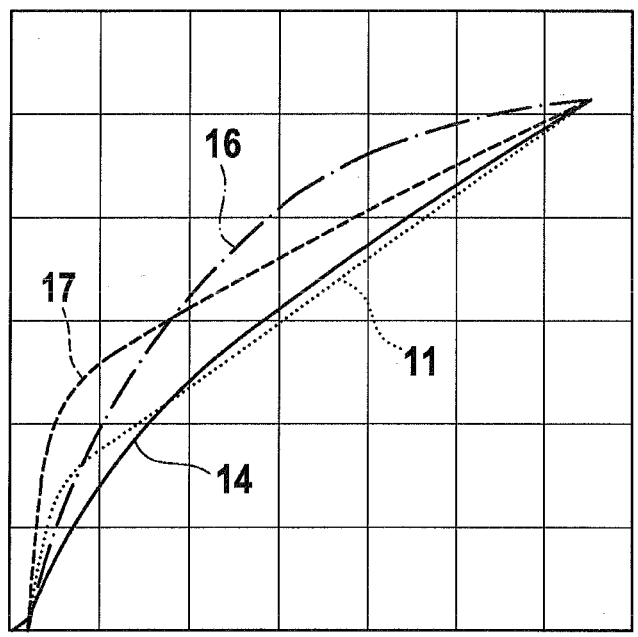
Figure 3:
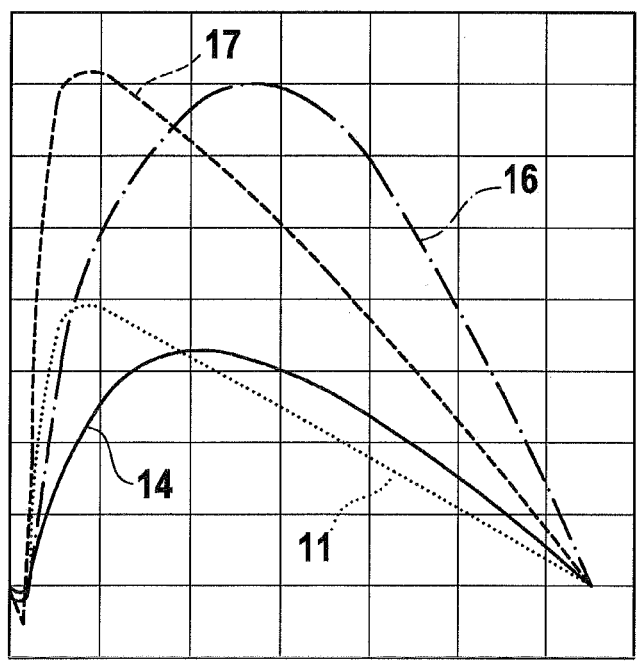
Figure 4:
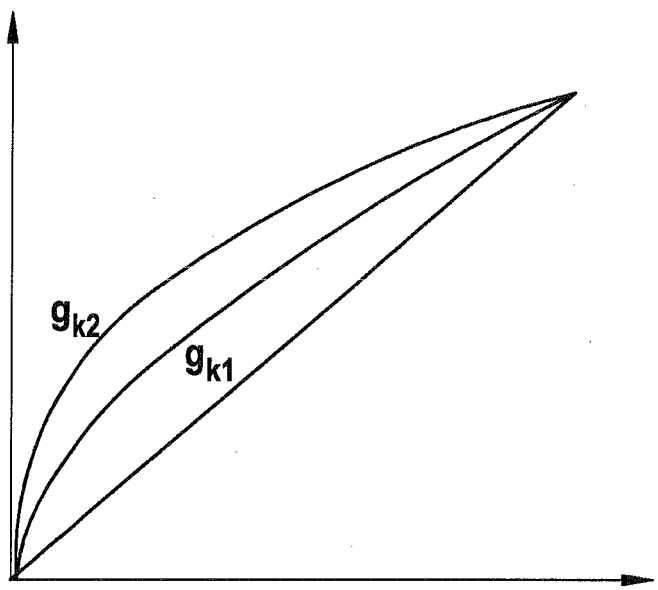
Figure 5:
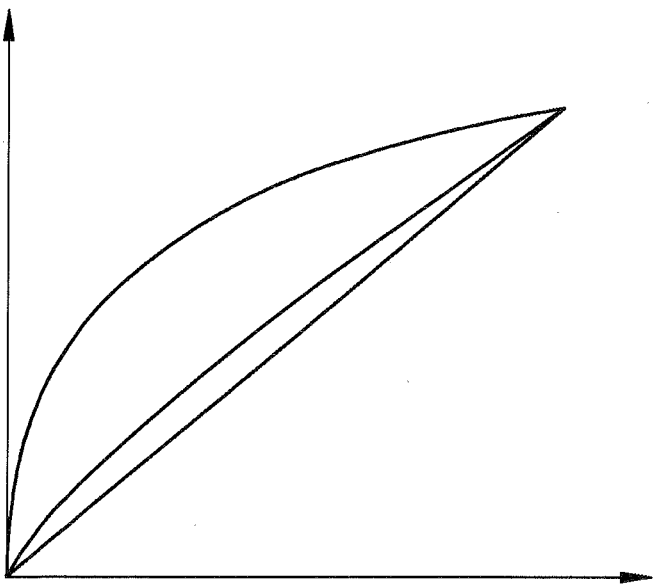
Figure 6:
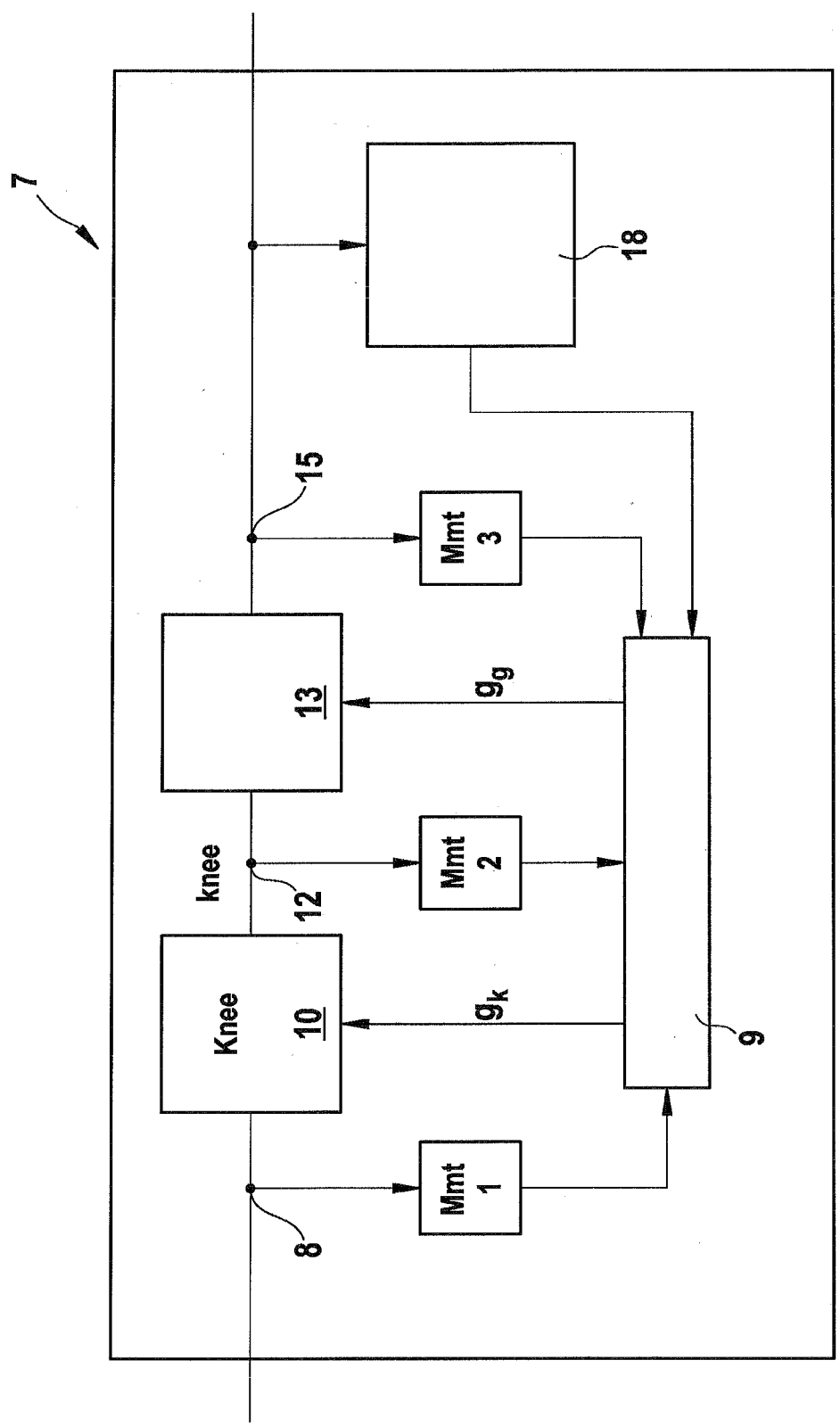
Figure 7:
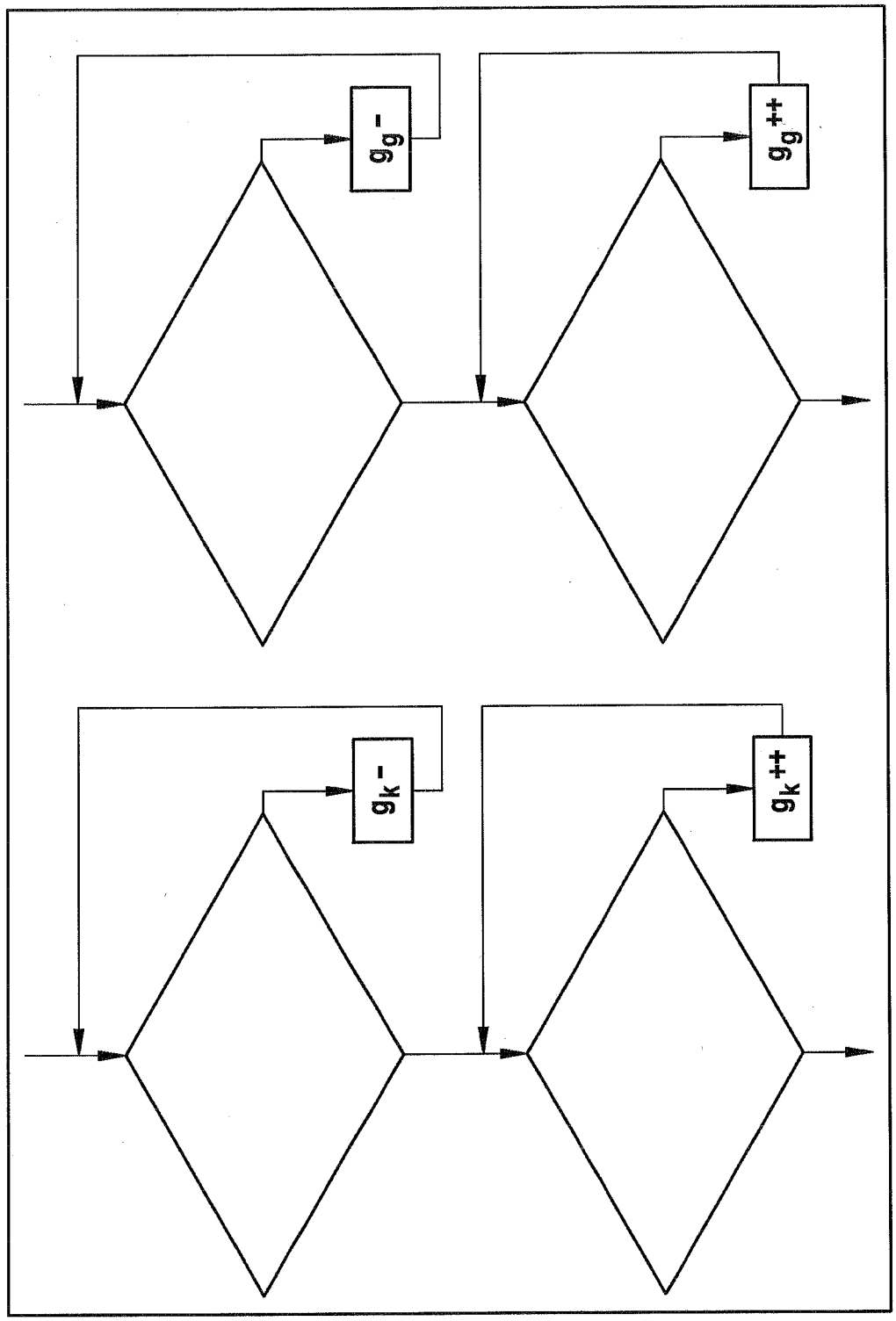
Figure 8:
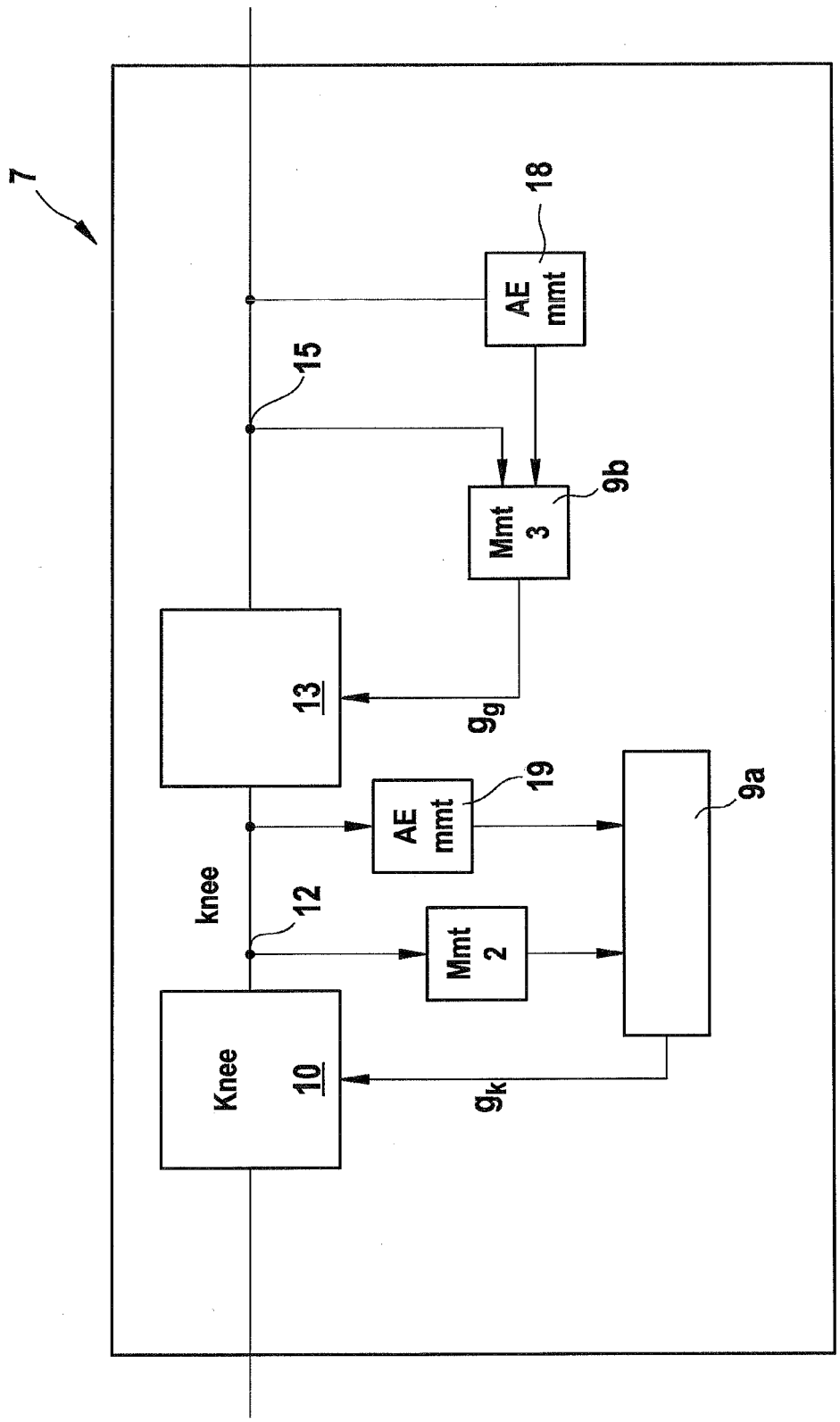
Figure 9:
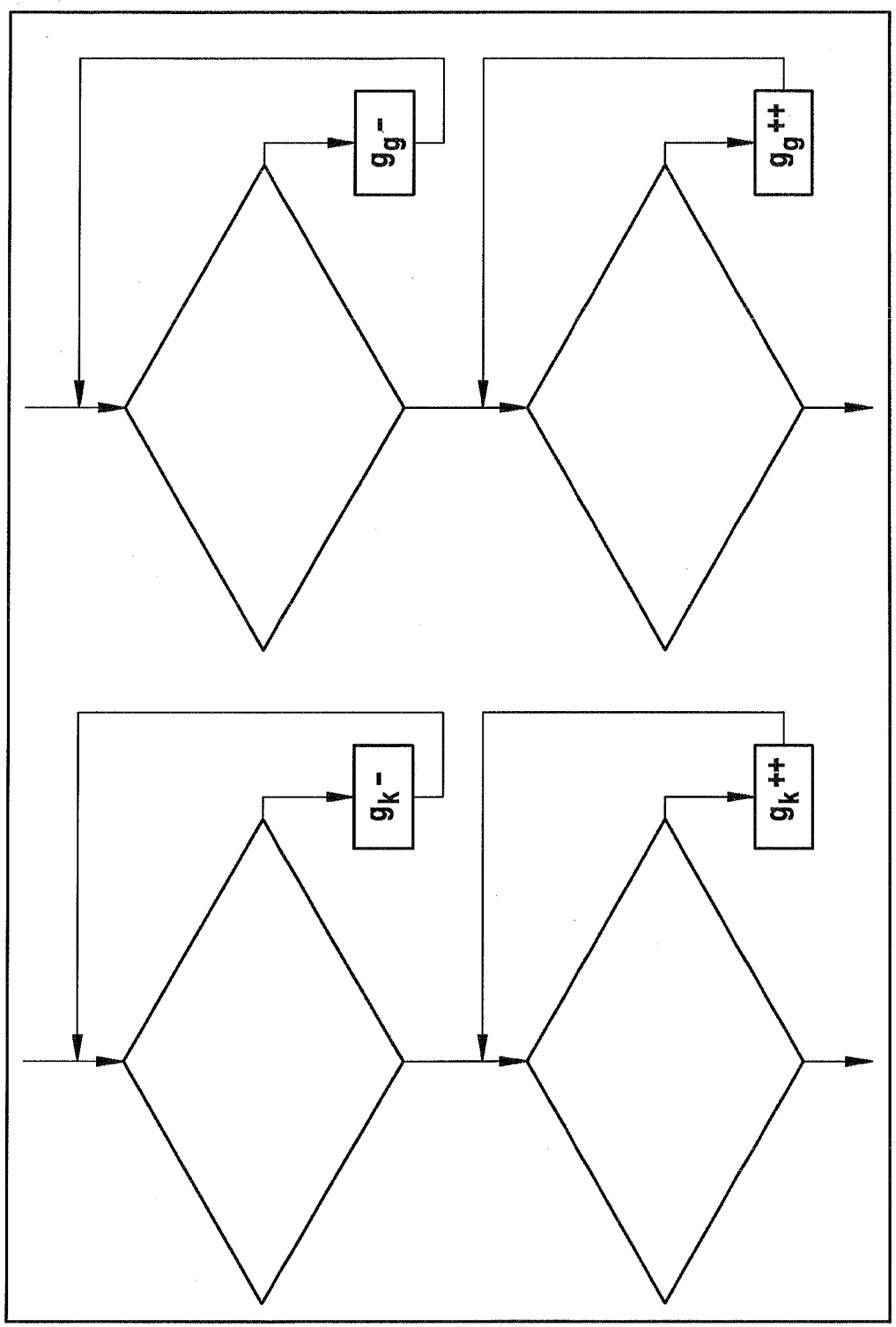

Further advantages, features and effects of the present invention are disclosed in the following description and the drawings of preferred embodiments of the invention. The figures show:

FIG. 1 a block diagram of an image processing system comprising an image processing unit as a first embodiment of the invention;

FIG. 2 a graph illustrating the curves of various transfer functions;

FIG. 3 a graph illustrating the deviations of the curves in FIG. 2;

FIG. 4 a graph illustrating the effect of different gain parameters applied on a knee function;

FIG. 5 a graph illustrating the curves of the knee function with applied minimum and maximum gain parameter;

FIG. 6 a block diagram of an image processing unit as a second embodiment of the invention;

FIG. 7 a flow diagram presenting a first control algorithm as a first embodiment of the process according to the invention;

FIG. 8 a block diagram of an image processing unit as a third embodiment of the invention;

FIG. 9 a flow diagram presenting a second control algorithm as a second embodiment of the process according to the invention.

EMBODIMENTS OF THE INVENTION

FIG. 1 shows an image processing system 1 comprising an input interface 2 connectable to receive an input image or a sequence of input images from an image sensor 3, which monitors an input scene, and an output interface 4 for outputting the processed input image or sequence of input images—afterwards both referenced as input image—as an output image or a sequence of output images—afterwards both referenced as output image—, respectively.

The image processing system 1 further comprises an optional pre-processing image unit 5 for pre-processing the input images and an optional post-processing unit 6 for post-processing the output images. Sequentially between the pre-processing image unit 5 and post-processing unit 6 a detail enhancing unit 7 as a first embodiment of the invention is arranged to receive the pre-processed input images and to release the output images. The output images may be displayed on a monitor or the like.

At a first measurement node 8 a statistical measurement is carried out on the input image, thereby deriving a statistical measurement result, which is embodied as a median value, a mode value or a skewness value of the input image or of part of the input image. In general any statistical measurement may be used retrieving information about the intensity or luminance distribution of the pixels of the input image. The measurement result is guided to a measurement and control unit 9.

Afterwards the input image is transferred to a first image processing unit 10, which applies a first transfer function in form of a so-called knee function 11 on the input image thereby generating an intermediate image. In order to steer or control the steepness of the knee-function 11 a gain factor $g_k$ is provided by the measurement and control unit 9.

In a following second measurement node 12 a further statistical measurement is carried out in the same manner as at the first measurement node. Especially the same part of the image is considered and the same measurement method is employed. Optionally a mean or average value of the intensity or luminance is additionally measured. The results of the statistical measurement is sent to the measurement and control unit 9.

The next functional block is a second image processing unit 13, which applies a second transfer function in form of a so-called gamma-function 14 on the intermediate image, thereby generating the output image. The steepness of the gamma-function is steered or controlled by a gain parameter $g_g$ from the measurement and control unit 9.

The output image is guided to a third measurement node 15, in which a further statistical measurement is performed in the same manner as in the first and second measurement node 8 and 12. The results are transferred to the measurement and control unit 9. Afterwards the out image is output for the optional post-processing.

The measurement and control unit 9 uses the statistical measurement results or a part thereof to optimise the settings, especially the gain factors $g_k$ and $g_g$ of the knee function 11 and the gamma function 14, so that the functions are steered separately or in combination with each other. Knee and gamma function 11, 14 can be steered by incrementing/decrementing the gain parameters $g_k$ and $g_g$, so that no visible luminance steps are introduced from one of the output images to the next of the output images since the maximum change of gain per field is restricted and for example kept under 0.1 dB.

For a better understanding of the detail enhancing unit 7 reference is made to the FIGS. 2 and 3 illustrating curves of various transfer functions (FIG. 2) and the curve deviations thereof (FIG. 3). The axes of both figures are referenced to the normalized input level and to the normalized output level of a image or video signal. The underlying idea of applying transfer functions on the images is to compensate other transfer functions in the overall system, which may be introduced for example by the image sensor or by the CRT. It was observed that the known gamma function 14 as the only transfer function is often not enough to improve visibility of dark image details due to compression of the dynamic range of the image sensor to the display device. So-called extended range gamma functions 16 improve visibility in the dark areas but introduces extreme compression of a large portion of the input range and makes the resulting output image pale. To overcome this disadvantage, the detail enhancing unit 7 (FIG. 1) uses two transfer functions, namely the gamma function 14 and additionally the knee function 11. The knee transfer function is a black stretch function made to enhance visibility in the darker parts of the scene or image and is especially useful for scenes with a high dynamic range and signal to noise ratio (SNR) good enough for, amplification. As noted in the FIGS. 2 and 3, the knee transfer function is steeper than the gamma function in the beginning of the input range and introduces less compression in the last part of the input range. As a final result, it is possible to have an overall transfer function 17, that is steeper in the beginning and much less compressing at the end of the luminance range.

As the amount of stretching is scene-, light- and sensor dependent, a flexible solution, especially circuit or algorithm, is employed in the measurement and control unit 9, using for example quadratic splines, for calculating the gain parameters $g_k$ and $g_g$. FIG. 4 illustrates the effect of applying various gain parameters $g_{k1}$ and $g_{k2}$ ($g_{k1}<g_{k2}$) to the knee function 11. Similar curves may be generated for the gamma function 14 with different gain factors $g_g$. With the gain parameters $g_g$ and $g_k$ it is also possible to change the amount of knee/gamma action in a smooth way to optimise the output image using only one control or gain parameter per transfer function. As a result the image processing unit 7 in FIG. 1 provides dynamic knee and gamma transfer function control to optimise the visibility of the scene content. In order to restrict the maximum transfer function stretching minimum and maximum gain parameters are set, so that a maximum knee function max_knee (FIG. 5) and a minimum knee function min_knee (FIG. 5) is used by the image processing unit 7.

FIG. 6 depicts a block diagram of a image processing unit 7 as a second embodiment of the invention, which is based on the first embodiment of the invention, whereby the same reference numbers are indicating the same parts in the two embodiments.

According to the second embodiment, at the statistical measurement nodes 8, 12 and 15 median measurements Mmt 1, Mmt 2 and Mmt 3 are performed on the input, intermediate and output image, respectively. In an alternative embodiment instead of median other measurements are used, which represent data tendency in the image histogram, for example mode measurement or skewness measurement. Further an auto-exposure measurement is performed in an auto-exposure block 18 on the output image in order to retrieve the average or mean value of the luminance or intensity of the output image. The results of the measurements are guided into the measurement and control unit 9, which determines gain parameters $g_k$ and $g_g$ for the transfer knee 11 and gamma 14 function.

A possible control strategy for the image processing unit 7 will be explained with reference to FIG. 7, which shows flow diagram of a control algorithm. The control strategy is to calculate medians at corresponding places and to make them equal to a certain percentage of the mean video level at the output, which is measured in the auto-exposure block 18. In this way, the level of the knee/gamma transfer gain parameters are coupled to the average video level, so that the video-signal or the input images are not over-compensated, especially at low luminance levels by adapting the gain parameters of the knee/gamma transfer functions. As a result, the mean and median (or equivalent) values are changed. By such an action, redistribution of the image histogram will be performed to obtain an improved histogram distribution.

As it can be seen in FIG. 7, the incrementing and decrementing of the gain parameters $g_k$ and $g_g$ are performed in parallel. At the left side of the flow diagram the gain parameter $g_k$ is calculated by two loops. In the first loop the following two conditions are evaluated:

$$\text{Med\_knee} > (a+d_1)*\text{Mean\_gamma} \qquad (I)$$

$$g_k > \text{min\_knee} \qquad (II)$$

with:
med_knee median value Mmt 2,
mean_gamma average value measured in the auto-exposure block 18
$d_1$ hysteresys parameter, typical value 0.05 a value between 0 and 1 depending on the input image and/or user preferences, standard setting is 0.5

$g_k$ gain parameter for the knee function min_knee preset minimum for the gain parameter $g_k$ In case both conditions I and II are fulfilled, the gain parameter $g_k$ is decremented ($g_k$--). In case any of the conditions I and II is not fulfilled, the first loop is ended and the second loop starts checking the following conditions:

$$Med\_knee < a * Mean\_gamma \quad (III)$$

$$g_k < max\_knee \quad (IV)$$

with additionally:

max_knee preset maximum for the gain parameter $g_k$.

In the second loop, the gain parameter $g_k$ is incremented ($g_k$++) in case both of the conditions are fulfilled.

The gain parameter $g_g$ is calculated according to the flow diagram on the right side of FIG. 7, whereby the following variables are used:

Med_gamma median value Mmt 3 mean_gamma average value measured in the auto-exposure block 18

$d_2$ hysteresys parameter, typical value 0.05 b value between 0 and 1 depending on the input image and/or user preferences, standard setting is 0.85;

Preferably, b is larger than a, especially b is smaller than 2*a min_gamma preset minimum for the gain parameter $g_g$ max_gamma preset maximum for the gain parameter $g_g$ The median is chosen as a control measurement since it is a simple description of pixel distribution of central tendency in the image histogram. Instead of median, also measurements can be used that give the luminance level at which some other percentage (other than 50%) of pixels is lower than that luminance value. Other kinds of measurement are also possible, which allow to measure where the majority of pixels is, how many dark pixels are left after each control and how many new bright pixels are introduced due to gamma transfer.

FIG. 8 shows a third embodiment of the present invention realised as a image processing unit 7, whereby the same reference numbers indicate the same parts as in the previous figures. The main difference to the preceding embodiments is that according to the third embodiment after each image processing unit 10 and 13 the median value and the mean value of the intermediate image and the output image, respectively, is calculated and sent to two control and measurement units 9a and 9b respectively. Of course both control and measurement units 9a and 9b may be integrated in a common casing or computer program.

FIG. 9 is a second flow diagram illustrating a second control algorithm, which can be used in the image processing unit 7 in FIG. 8. The difference between the first control algorithm and the second control algorithm is that the gain parameter $g_k$ is calculated by a comparison of the median value of the intermediate image with the mean value of the luminance (Mean_knee) of the intermediate image and not of the output image. As a result, more freedom is given to the control algorithm to optimise the knee transfer function.

The invention claimed is:

1. Process for enhancing detail visibility in a digital input image comprising:

a step of applying a first transfer function (11) operating as a knee function (11) to the digital input image, thereby generating an intermediate image;

a step of performing a first statistical measurement (12, Mmt 2) on the intermediate image;

a step of applying a second transfer function (14) operating as a gamma function (14) to the intermediate image, thereby generating an output image;

a step of performing a second statistical measurement (15, Mmt 3) on the output image, a step of determining gain parameters (gg, gk) for the first and the second transfer function (11, 14) on basis of results of the first and second statistical measurements (12, 15, Mmt 2, Mmt 3).

2. Process according to claim 1, characterized in that the first and second statistical measurements are realised as an intensity or luminance histogram based measurement and/or an intensity or luminance distribution measurement on the intermediate image and on the output image and optional on the input image.

3. Process according to claim 1, characterized in that the first and second statistical measurements are performed as a median, mode and/or skewness measurement on the intensity or luminance distribution of the intermediate image and the output image and optionally on the input image.

4. Process according to claim 1, characterized in that the gain parameters (gk, gg) are determined on basis of the first and second statistical measurement results and additionally on a basis of an average intensity level of the input, intermediate and/or output image.

5. Process according to claim 1, characterized in that the gain parameters are determined by the first and second statistical measurement results of both statistical measurements (12, 15, Mmt 2, Mmt 3) and the average intensity level of the output image (AE Mmt).

6. Process according the claim 1, characterized in that the gain parameter (gk, gg) for the first transfer function (11) is determined by the statistical measurement result of the first statistical measurement (12, Mmt2) and the average intensity or luminance level of the intermediate image and/or the gain parameter for the second transfer function is determined by the statistical measurement result of the second statistical measurement (15, Mmt3) and the average intensity or luminance level of the output image.

7. Process according to claim 1, characterized in that the determining step is performed by a comparison of the statistical measurement results of the first and the second statistical measurements (12, 15, Mmt2, Mmt3) with the average intensity or luminance level.

8. Process according to claim 1, characterized that the gain is attenuated or amplified iteratively stepwise, especially with a predetermined maximum value.

9. Computer program product comprising computer readable instructions embedded in a non-transitory computer-readable medium for performing all the steps of claim 1, when said computer program product is executed by a computer.

10. Apparatus (7) for enhancing detail visibility in a digital input image, comprising:

a first image processing unit (10) operable to apply a first transfer function (11) embodying a knee circuit on the digital input image, thereby generating an intermediate image;

a first statistical measurement unit (12) operable to perform a first statistical measurement on the intermediate image to generate a first statistical measurement result;

a second processing unit (13) operable to apply a second transfer function embodying a gamma circuit (14) on the intermediate image, thereby generating an output image;

a second statistical measurement unit (15) operable to perform a second statistical measurement on the output image to generate a second statistical measurement result;

a determining unit (9) operable to determine gain parameters for the first and the second transfer function (11, 14) on basis of the first and the second statistical measurement results.

11. Process for enhancing detail visibility in a digital input image, comprising:
    a step of applying a first transfer function operating as a knee function to the digital input image, thereby generating an intermediate image;
    a step of performing a statistical measurement on the intermediate image;
    a step of applying a second transfer function operating as a gamma function to the intermediate image, thereby generating an output image;
    a step of performing the statistical measurement first performed on the intermediate image a second time on the output image,
    a step of determining gain parameters (gg, gk) for the first and the second transfer function on a basis of results of the statistical measurements performed on the intermediate and output images.

\* \* \* \* \*